United States Patent
Sato

(10) Patent No.: US 10,295,035 B2
(45) Date of Patent: May 21, 2019

(54) FLUID COUPLING

(71) Applicant: EXEDY Corporation, Neyagawa-shi, Osaka (JP)

(72) Inventor: Keiji Sato, Neyagawa (JP)

(73) Assignee: EXEDY CORPORATION, Neyagawa-Shi, Osaka (JP)

( * ) Notice: Subject to any disclaimer, the term of this patent is extended or adjusted under 35 U.S.C. 154(b) by 81 days.

(21) Appl. No.: 15/517,840

(22) PCT Filed: Aug. 7, 2015

(86) PCT No.: PCT/JP2015/072582
§ 371 (c)(1),
(2) Date: Apr. 7, 2017

(87) PCT Pub. No.: WO2016/084431
PCT Pub. Date: Jun. 2, 2016

(65) Prior Publication Data
US 2017/0299032 A1     Oct. 19, 2017

(30) Foreign Application Priority Data
Nov. 25, 2014   (JP) .................................. 2014-237612

(51) Int. Cl.
*F16H 45/02* (2006.01)
*F16H 41/24* (2006.01)
(Continued)

(52) U.S. Cl.
CPC ......... *F16H 45/02* (2013.01); *F16D 25/0635* (2013.01); *F16H 41/24* (2013.01);
(Continued)

(58) Field of Classification Search
None
See application file for complete search history.

(56) References Cited

U.S. PATENT DOCUMENTS 5,125,486 A * 6/1992 Murata ................... F16H 45/02
192/208
5,813,505 A   9/1998 Olsen et al.
(Continued)

FOREIGN PATENT DOCUMENTS

CN   101305212 A   11/2008
CN   103958935 A   7/2014
(Continued)

OTHER PUBLICATIONS

International Search Report dated Oct. 6, 2015 for corresponding foreign Application No. PCT/JP2015/072582, 2 pp.
(Continued)

*Primary Examiner* — Mark A Manley
(74) *Attorney, Agent, or Firm* — United IP Counselors, LLC

(57) ABSTRACT

A torque converter includes a front cover, an output shaft member, a piston, a clutch, an impeller, and a turbine. The piston is supported by the output shaft member. The piston slides on the output shaft member in an axial direction. The piston extends in a radial direction. The clutch is disposed between the front cover and the piston. The impeller includes an impeller shell and an impeller blade. The impeller shell is fixed to the front cover. The impeller blade is attached to the impeller shell. The turbine includes a turbine shell, a turbine blade and a connecting portion. The turbine shell is disposed in opposition to the impeller. The turbine blade is attached to the turbine shell. The connecting portion connects the piston and the turbine shell so as to make the piston and the turbine shell unitarily rotatable.

9 Claims, 10 Drawing Sheets

(51) Int. Cl.
*F16D 25/0635* (2006.01)
*F16D 3/12* (2006.01)

(52) U.S. Cl.
CPC ........ *F16D 3/12* (2013.01); *F16H 2045/0221* (2013.01); *F16H 2045/0247* (2013.01); *F16H 2045/0278* (2013.01); *F16H 2045/0294* (2013.01)

(56) References Cited

U.S. PATENT DOCUMENTS

| | | | | |
|---|---|---|---|---|
| 6,056,093 | A * | 5/2000 | Hinkel | F16H 41/26 192/212 |
| 6,431,335 | B1 * | 8/2002 | Kundermann | F16H 45/02 192/3.3 |
| 6,497,312 | B1 * | 12/2002 | Sasse | F16H 45/02 192/107 R |
| 2009/0247307 | A1 * | 10/2009 | Ishikawa | F16F 15/12373 464/68.8 |
| 2013/0186724 | A1 * | 7/2013 | Miyahara | F16F 15/145 192/3.23 |
| 2013/0230285 | A1 * | 9/2013 | Skilnick | G02B 6/4248 385/93 |
| 2013/0230385 | A1 | 9/2013 | Lindemann et al. | |
| 2014/0097055 | A1 * | 4/2014 | Lindemann | F16H 41/24 192/3.21 |

FOREIGN PATENT DOCUMENTS

| | | | |
|---|---|---|---|
| JP | 8-312749 | * | 11/1996 |
| JP | 2004100714 | A | 4/2004 |
| JP | 2004332801 | A | 11/2004 |
| JP | 2007239811 | A | 9/2007 |
| JP | 2013076416 | A | 4/2013 |
| JP | 2014047811 | A | 3/2014 |
| JP | 2014219056 | A | 11/2014 |

OTHER PUBLICATIONS

Office Action dated May 10, 2016 for Japanese Application No. 2014-237612, filed Nov. 25, 2014, 6 pp.
First Office Action of the Chinese patent application No. 201580061111.6, dated Nov. 13, 2018, 7 pp.

* cited by examiner

FLUID COUPLING

CROSS-REFERENCE TO RELATED APPLICATIONS

This application is the U.S. National Phase of PCT International Application No. PCT/JP2015/072582, filed on Aug. 7, 2015. That application claims priority to Japanese Patent Application No. 2014-237612, filed Nov. 25, 2014. The contents of both applications are herein incorporated by reference in their entirety.

BACKGROUND

Technical Field

The present disclosure relates to a fluid coupling.

Background Art

A fluid coupling includes an impeller and a turbine in its interior, and transmits a torque through hydraulic oil contained in its interior. The impeller is fixed to a front cover into which a torque is inputted from an engine. The turbine is disposed in opposition to the impeller within a fluid chamber. When the impeller is rotated, the hydraulic oil flows from the impeller to the turbine. The flow of the hydraulic oil rotates the turbine, whereby the torque is outputted.

A lock-up device is disposed between the front cover and the turbine. The lock-up device mechanically couples the front cover and the turbine, whereby the torque is directly transmitted from the front cover to the turbine.

The lock-up device is not installed in a torque converter disclosed in United States Patent Application Publication No. 2013/0230385 in order to produce the torque converter with a small dimension. As a result, the torque converter can be produced with a small axial dimension.

BRIEF SUMMARY

The aforementioned torque converter of United States Patent Application Publication No. 2013/0230385 does not include the lock-up device, but instead, includes a turbine that is movable in the axial direction. Additionally, the torque converter includes a friction member between the turbine and the impeller so as to enable the turbine and the impeller to be engaged by friction with each other. When moved toward the impeller, the turbine is engaged by friction with the impeller through the friction member. Accordingly, the torque from the engine can be directly transmitted to the turbine. In other words, a lock-up state can be made.

Incidentally, a general lock-up device moves the turbine toward the front cover, whereby the lock-up state is made. By contrast, the torque converter of United States Patent Application Publication No. 2013/0230385 moves the turbine toward the impeller, in other words, oppositely to the front cover, whereby the lock-up state is made. This construction results in a drawback that a direction of hydraulic oil to be supplied for making a lock-up state in the torque converter of United States Patent Application Publication No. 2013/0230385 is different from that in the general torque converter.

It is an object of the present disclosure to provide a fluid coupling that can be compactly produced without changing a direction of actuation fluid to be supplied when a lock-up state is made.

A fluid coupling according to an aspect of the present disclosure is rotatable about a rotational axis. The fluid coupling includes a front cover, an output shaft member, a piston, a clutch, an impeller and a turbine. The front cover is a constituent element into which a torque is inputted. The output shaft member is rotatable about the rotational axis. The output shaft member outputs the torque. The piston is supported by the output shaft member. The piston is capable of sliding on the output shaft member in an axial direction. The piston extends in a radial direction. The clutch is disposed between the front cover and the piston. The impeller includes an impeller shell and an impeller blade. The impeller shell is fixed to the front cover. The impeller blade is attached to the impeller shell. The turbine includes a turbine shell, a turbine blade and a connecting portion. The turbine shell is disposed in opposition to the impeller. The turbine blade is attached to the turbine shell. The connecting portion connects the piston and the turbine shell so as to make the piston and the turbine shell unitarily rotatable.

According to this construction, when the piston is moved toward the front cover, the piston and the front cover are engaged through the clutch. As a result, the torque from the front cover is transmitted to the piston through the clutch in a direct manner. Thus, in the fluid coupling according to the disclosure of the present application, the piston is moved toward the front cover when a lock-up state is made. Hence, a supply direction of an actuation fluid is the same as that in a general fluid coupling.

Additionally, the turbine shell is connected to the piston through the connecting portion. In other words, the turbine shell is supported by the output shaft member through the piston. Hence, it is not required to install a member for supporting the turbine shell on the radially inner side of the turbine shell. With the space located on the radially inner side of the turbine shell, the fluid coupling can be reduced in dimension by that much.

An inner peripheral surface of the turbine shell may be located away from the output shaft member in the radial direction. In other words, the turbine shell is not held by the output shaft member in the radial direction, the axial direction and a rotational direction.

The fluid coupling may further include a damper mechanism. The damper mechanism couples the output shaft member and either of the turbine and the piston so as to make the output shaft member and the either of the turbine and the piston rotatable relatively to each other.

The damper mechanism may include a holder member and an elastic member. The holder member extends in the radial direction. The holder member is unitarily rotated with the output shaft member. The elastic member is held by the holder member.

The damper mechanism may further include a support portion. The support portion supports the turbine in the axial direction.

The support portion may be disposed at an interval from the holder member in the axial direction. The turbine includes a hook portion. The hook portion extends from the turbine shell. The hook portion is disposed between the support portion and the holder member.

The turbine may further include a first engaging part. The first engaging part is engaged with the elastic member.

The piston may include a second engaging part. The second engaging part is engaged with the elastic member.

The connecting portion may connect the piston and the turbine shell so as to make the piston and the turbine shell movable relatively to each other in the axial direction.

According to this construction, when the lock-up state is made, only the piston can be moved without moving the turbine shell.

The connecting portion may connect the piston and the turbine shell so as to make the piston and the turbine shell immovable relatively to each other in the axial direction.

The connecting portion may be integrated with the piston and the turbine shell.

The clutch may be a friction member attached to the piston.

The fluid coupling according to the present disclosure can be compactly produced without changing a direction of actuation fluid to be supplied when a lock-up state is made.

DETAILED DESCRIPTION OF EMBODIMENTS

Figure 1:
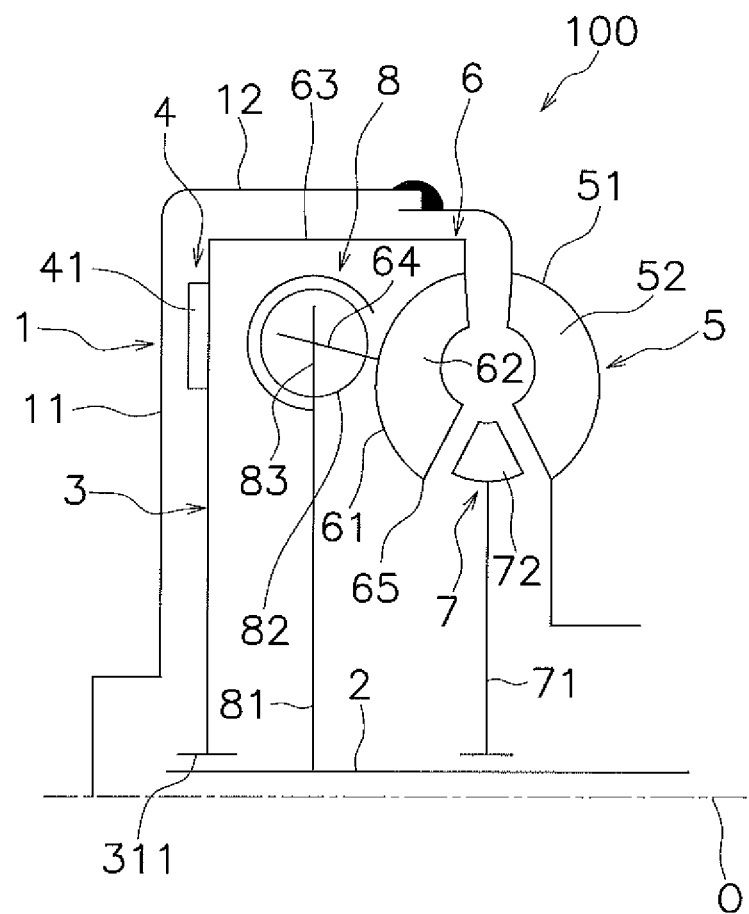
FIG. 1 is a schematic diagram of a torque converter.

A torque converter 100, which is an exemplary embodiment of a fluid coupling according to the present disclosure, will be hereinafter explained with reference to drawings. FIG. 1 is a schematic diagram of the torque converter. In the following explanation, the term "axial direction" means an extending direction of a rotational axis O of the torque converter 100. Additionally, the term "radial direction" means a radial direction of an imaginary circle about the rotational axis O. The term "circumferential direction" means a circumferential direction of the imaginary circle about the rotational axis O. A right-and-left direction in FIG. 1 is synonymous with the term "axial direction". It should be noted that an engine is disposed on the left side in FIG. 1 whereas a transmission is disposed on the right side in FIG. 1, although the engine and the transmission are not shown in FIG. 1.

As shown in FIG. 1, the torque converter 100 is rotatable about the rotational axis O. The torque converter 100 includes a front cover 1, an output shaft member 2, a piston 3, a clutch 4, an impeller 5 and a turbine 6. Additionally, the torque converter 100 further includes a stator 7 and a damper mechanism 8.

The front cover 1 is a member into which a torque from the engine is inputted. When described in detail, the front cover 1 includes a disc part 11 and a first tubular part 12. The first tubular part 12 extends from an outer peripheral end of the disc part 11 toward the transmission.

The output shaft member 2 is rotatable about the rotational axis O. The output shaft member 2 outputs the torque.

When described in detail, the output shaft member 2 outputs the torque from the engine to the transmission. It should be noted that when a lock-up state is not being made, the output shaft member 2 outputs to the transmission the torque sequentially transmitted thereto in the order of the front cover 1, the impeller 5, the turbine 6 and the damper mechanism 8. When the lock-up state is being made, the output shaft member 2 outputs to the transmission the torque sequentially transmitted thereto in the order of the front cover 1, the piston 3, the turbine 6 and the damper mechanism 8.

For example, the output shaft member 2 is made in the shape of a cylinder extending in the axial direction. A transmission-side member (e.g., an input shaft member) is fitted to the interior of the output shaft member 2. With this construction, the output shaft member 2 and the transmission-side member are unitarily rotated.

The piston 3 radially extends from the output shaft member 2. When described in detail, the piston 3 extends radially outside from the output shaft member 2. The piston 3 extends to the vicinity of the first tubular part 12 of the front cover 1.

The piston 3 is supported by the output shaft member 2, and is axially movable on the output shaft member 2. Additionally, the piston 3 is rotatable relatively to the output shaft member 2. When described in detail, the piston 3 has a disc shape and includes a through hole 311 in its middle part. The through hole 311 is penetrated by the output shaft member 2. The piston 3 makes contact at its inner peripheral surface with the output shaft member 2.

The clutch 4 is disposed between the front cover 1 and the piston 3. The clutch 4 is configured to transmit or block the torque from the front cover 1 to the piston 3. The clutch 4 is a friction member 41 attached to the piston 3. The friction member 41 is attached to the outer peripheral end of the piston 3. It should be noted that the friction member 41 may be attached to the front cover 1. In this construction, the friction member 41 is opposed to the piston 3.

The impeller 5 includes an impeller shell 51 and a plurality of impeller blades 52. The impeller shell 51 is fixed to the front cover 1. When described in detail, the impeller shell 51 is welded to the front cover 1.

The impeller blades 52 are attached to the impeller shell 51. When described in detail, the impeller blades 52 are fixed to the inner peripheral surface of the impeller shell 51.

The turbine 6 includes a turbine shell 61, a plurality of turbine blades 62 and a connecting portion 63. The turbine 6 is disposed in opposition to the impeller 5.

The turbine shell 61 is disposed in opposition to the impeller 5. The turbine shell 61 includes an opening in its middle part. An inner peripheral surface 65 of the turbine shell 61 is located radially away from the output shaft member 2. In other words, the inner peripheral surface 65 of the turbine shell 61 is disposed not to make contact with the output shaft member 2. Therefore, a space is produced between the turbine shell 61 and the output shaft member 2.

The position of the turbine shell 61 is configured to be completely separated from the output shaft member 2 in the radial and axial directions. Additionally, the turbine shell 61 is configured to perform circumferential torque transmission in a manner completely independent from the output shaft member 2.

For example, the distance between the inner peripheral surface 65 of the turbine shell 61 and the outer peripheral surface of the output shaft member 2 is about 30 mm or greater. Additionally, the inner diameter of the turbine shell 61 is, for instance, roughly greater than or equal to about twice the outer diameter of the output shaft member 2. It should be noted that torque converters have various sizes, and hence, the upper limit of the distance between the outer peripheral surface of the output shaft member 2 and the inner peripheral surface 65 of the turbine shell 61 is not limited to a specific value.

The turbine blades 62 are attached to the turbine shell 61. When described in detail, the turbine blades 62 are fixed to the inner peripheral surface of the turbine shell 61.

The connecting portion 63 connects the piston 3 and the turbine shell 61 so as to make the piston 3 and the turbine shell 61 unitarily rotatable. The connecting portion 63 connects the piston 3 and the turbine shell 61 so as to make the piston 3 and the turbine shell 61 immovable relatively to each other in, the axial direction. When described in detail, the connecting portion 63 is provided integrally with the piston 3 and the turbine shell 61. The connecting portion 63 may be fixed to the piston 3 and the turbine shell 61 by welding or so forth. Additionally, the piston 3, the turbine shell 61 and the connecting portion 63 may be integrated as a single member.

The connecting portion 63 connects the outer peripheral end of the piston 3 and that of the turbine shell 61. The connecting portion 63 has a cylindrical shape and extends in the axial direction. The connecting portion 63 is located radially outside the damper mechanism 8.

The turbine 6 further includes a plurality of first engaging parts 64. Each of the first engaging parts 64 is engaged with each of a plurality of elastic members 82. The first engaging parts 64 extend from the turbine shell 61 to the elastic members 82 of the damper mechanism 8 to be described, respectively. When described in detail, each first engaging part 64 makes contact with one end surface of each elastic member 82 in the circumferential direction. The first engaging parts 64 are disposed at intervals in the circumferential direction. The first engaging parts 64 are welded to the turbine shell 61.

The stator 7 is configured to regulate the flow of hydraulic oil returning from the turbine 6 to the impeller 5. The stator 7 is disposed between the impeller 5 and the turbine 6. The stator 7 includes a stator carrier 71 having a disc shape and a plurality of blades 72 mounted to the outer peripheral surface of the stator carrier 71.

The stator 7 is rotatable about the rotational axis O. When described in detail, the stator 7 is supported by a stationary shaft (not shown in the drawing) through a bearing (not shown in the drawing).

The damper mechanism 8 couples the turbine 6 and the output shaft member 2 so as to make the turbine 6 and the output shaft member 2 rotatable relatively to each other. When described in detail, the damper mechanism 8 elastically connects the turbine 6 and the output shaft member 2 in the circumferential direction. The damper mechanism 8 includes a holder member 81 and the plurality of elastic members 82.

The holder member 81 extends in the radial direction. The holder member 81 is unitarily rotated with the output shaft member 2. In other words, the holder member 81 is fixed to the output shaft member 2. For example, the holder member 81 is fixed thereto by fastening members such as swaging rivets. It should be noted that the holder member 81 may be integrated with the output shaft member 2 as a single member.

The holder member 81 includes a plurality of third engaging parts 83. Each of the third engaging parts 83 is engaged with each of the elastic members 82. When described in detail, each third engaging part 83 makes contact with the other end of each elastic member 82 in the circumferential direction. The number of the third engaging parts 83 is the same as that of the first engaging parts 64. Each third engaging part 83 and each first engaging part 64 interpose each elastic member 82 therebetween in the circumferential direction.

The elastic members 82 are held by the holder member 81. The respective elastic members 82 are, for instance, coil springs. It should be noted that the elastic members 82 are disposed at intervals in the circumferential direction.

Next, explanation will be provided for an action to be performed by the torque converter 100 when the lock-up state is made. When the lock-up state is made in the torque converter 100, the hydraulic oil is supplied to the space between the piston 3 and the impeller shell 51. When described in detail, the space between the piston 3 and the impeller shell 51 has been already filled with the hydraulic oil. Hence, the hydraulic oil, residing in the space between the piston 3 and the impeller shell 51, is raised in hydraulic pressure by further supplying the hydraulic oil to the space.

When the hydraulic oil, residing in the space between the piston 3 and the impeller shell 51, is raised in hydraulic pressure, the piston 3 is moved toward the front cover 1. As a result, the friction member 41 attached to the piston 3 is engaged by friction with the front cover 1. The front cover 1, the piston 3 and the turbine 6 are unitarily rotated. In other words, the torque from the front cover 1 is transmitted to the turbine 6 without through the impeller 5.

When the lock-up state is released in the torque converter 100, the hydraulic oil is supplied to the space between the piston 3 and the front cover 1. The piston 3 is thereby moved in a direction separating from the front cover 1. As a result, frictional engagement between the friction member 41 attached to the piston 3 and the front cover 1 is released. In other words, the torque from the front cover 1 is transmitted to the turbine 6 through the impeller 5.

In the torque converter 100 according to the aforementioned exemplary embodiment, the directions of the hydraulic oil to be supplied when the lock-up state is made and when the lock-up state is released are the same as those in a well-known torque converter.

Additionally, in the well-known torque converter, the turbine shell is required to make contact at its inner peripheral surface with the output shaft member 2 so as to support the turbine shell in the radial direction. By contrast, in the torque converter 100 according to the aforementioned exemplary embodiment, the turbine shell 61 is supported by the output shaft member 2 through the connecting portion 63 and the piston 3. In other words, the turbine shell 61 is not required to make contact at the inner peripheral surface 65 with the output shaft member 2. Hence, it is possible to form a space between the inner peripheral surface 65 of the turbine shell 61 and the output shaft member 2. Therefore, by utilizing this space for the purposes of, e.g., installation of a component of the torque converter, the torque converter can be made compact by that much.

[Modifications]

The exemplary embodiment of the present disclosure has been described above. However, the present disclosure is not limited to the aforementioned exemplary embodiment, and a variety of changes can be made without departing from the scope of the present disclosure.

Modification 1

Figure 2:
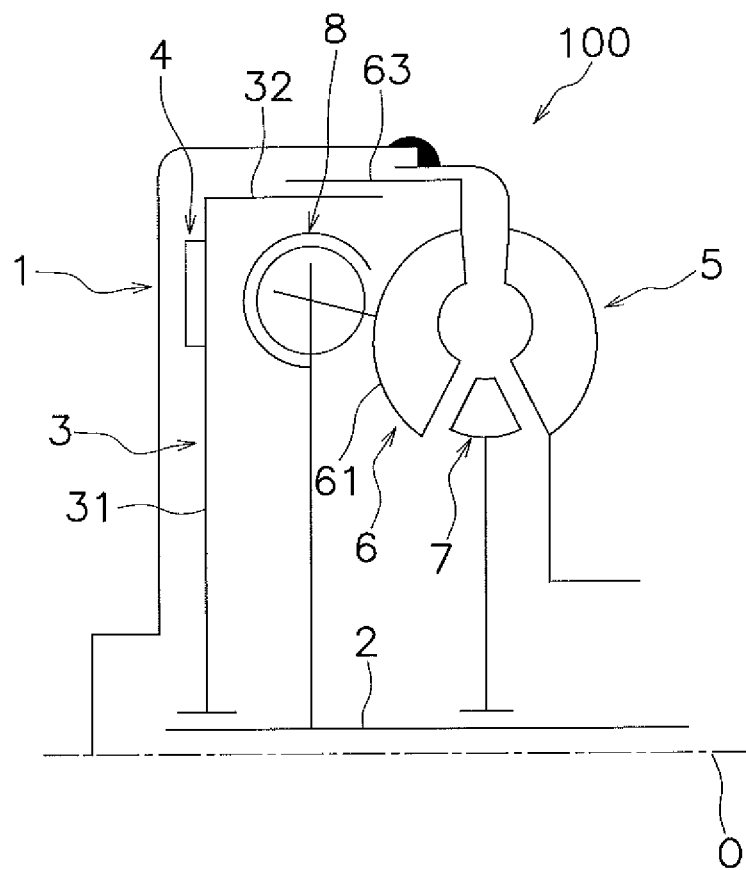
FIG. 2 is a schematic diagram of a torque converter according to modification 1.

As shown in FIG. 2, the connecting portion 63 of the turbine 6 may connect the turbine shell 61 and the piston 3 so as to make the turbine shell 61 and the piston 3 movable relatively to each other in the axial direction. For example, the piston 3 includes a piston body 31 and a second tubular portion 32.

The piston body 31 extends in the radial direction. The second tubular portion 32 extends from an outer peripheral end of the piston body 31 toward the turbine 6 in the axial direction. It is preferable that the second tubular portion 32 has a cylindrical shape.

The connecting portion 63 is engaged with the second tubular portion 32 in the circumferential direction. Therefore, the piston 3 and the turbine 6 are unitarily rotated. For example, the second tubular portion 32 and the connecting portion 63 are meshed with each other in the circumferential direction.

Specifically, the second tubular portion 32 are provided with a plurality of protrusions on its outer peripheral surface. The protrusions extend in the axial direction, while being aligned at intervals in the circumferential direction. On the other hand, the connecting portion 63 is provided with a plurality of grooves on its inner peripheral surface. The grooves extend in the axial direction, while being aligned at intervals in the circumferential direction. The protrusions of the second tubular portion 32 and the grooves of the connecting portion 63 are meshed with each other. For example, the second tubular portion 32 and the connecting portion 63 are spline-coupled.

Figure 3:
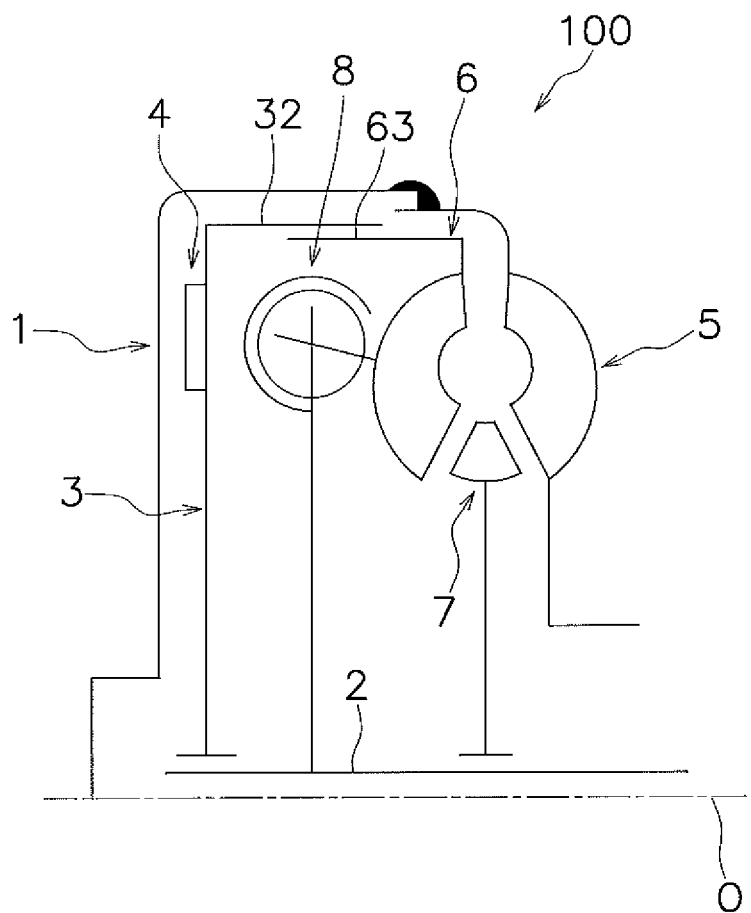
FIG. 3 is a schematic diagram of a torque converter according to modification 1.

The piston 3 and the turbine 6 are unitarily rotated by the construction that the protrusions of the second tubular portion 32 and the grooves of the connecting portion 63 are meshed with each other. On the other hand, the second tubular portion 32 and the connecting portion 63 are capable of sliding against each other in the axial direction. Therefore, the turbine 6 and the piston 3 are movable relatively to each other in the axial direction. It should be noted that as shown in FIG. 3, the outer peripheral surface of the connecting portion 63 and the inner peripheral surface of the second tubular portion 32 may be engaged in the circumferential direction.

Figure 4:
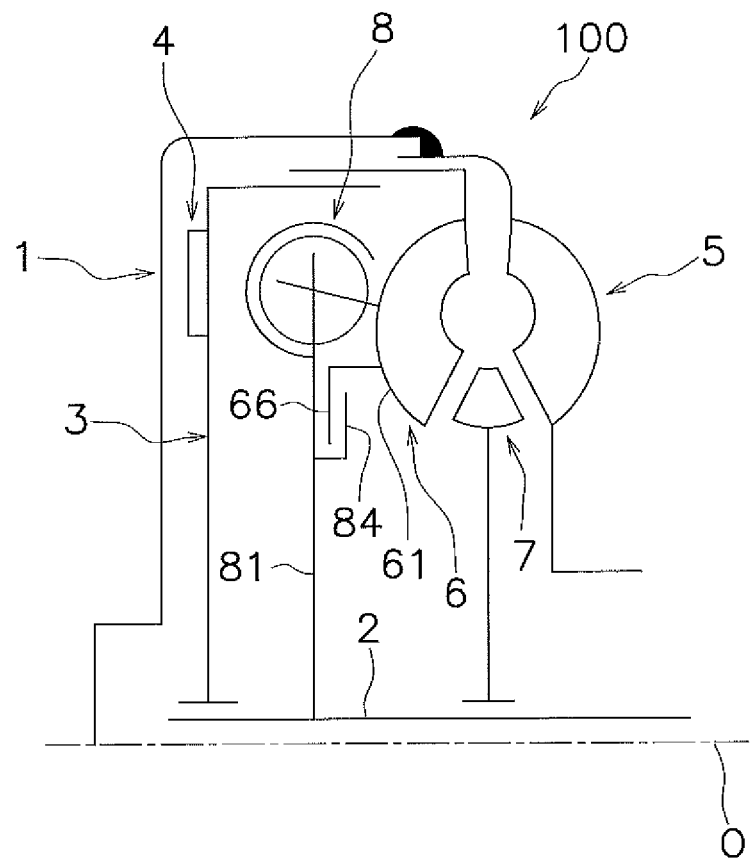
FIG. 4 is a schematic diagram of a torque converter according to modification 1.

Additionally, in modification 1, as shown in FIG. 4, the damper mechanism 8 may include a support portion 84. The support portion 84 supports the turbine 6 in the axial direction. The support portion 84 is disposed at an interval from the holder member 81 in the axial direction. A space, defined by the holder member 81 and the support portion 84, has an annular shape and extends in the circumferential direction. It should be noted that part of the support portion 84 is fixed to the holder member 81. For example, the support portion 84 is welded to the holder member 81.

The turbine 6 includes a hook portion 66. The hook portion 66 extends from the turbine shell 61 and is disposed between the holder member 81 and the support portion 84. It should be noted that the hook portion 66 preferably makes contact with the holder member 81 and the support portion 84. The hook portion 66 is thus disposed between the holder member 81 and the support portion 84, and hence, the turbine 6 is restricted from moving in the axial direction. It should be noted that the turbine 6 and the damper mechanism 8 are rotatable relatively to each other.

Modification 2

In the aforementioned exemplary embodiment, the damper mechanism 8 is constructed to couple the turbine 6 and the output shaft member 2 so as to make the turbine 6 and the output shaft member 2 rotatable relatively to each other. However, the construction of the damper mechanism 8 is not particularly limited to this. For example, the damper mechanism 8 may be constructed to couple the piston 3 and the output shaft member 2 so as to make the piston 3 and the output shaft member 2 rotatable relatively to each other.

Figure 5:
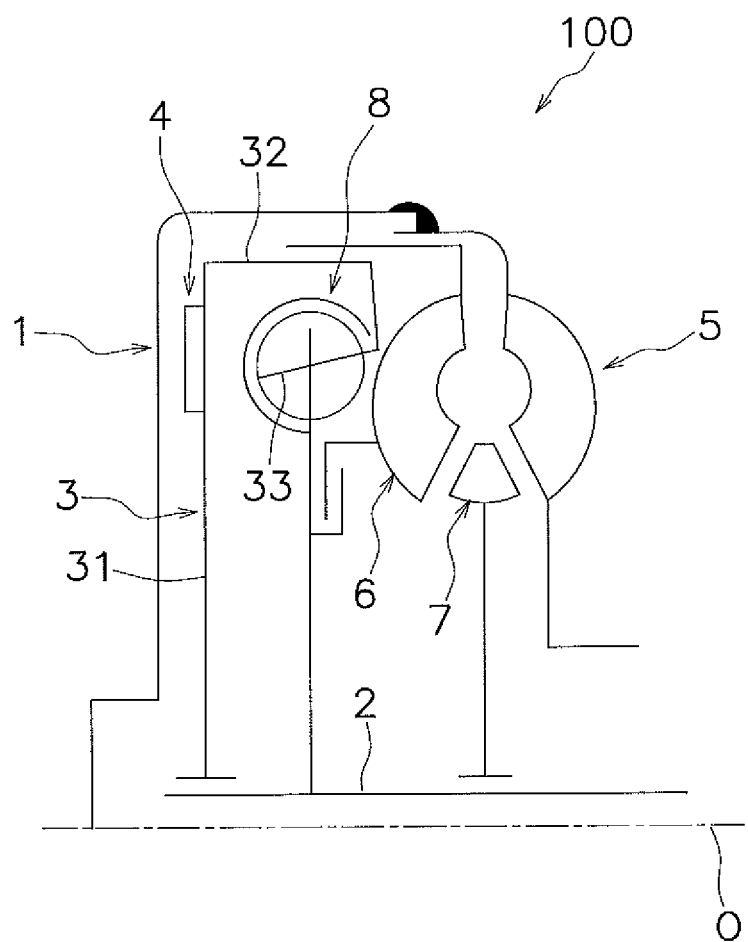
FIG. 5 is a schematic diagram of a torque converter according to modification 2.

When described in detail, as shown in FIG. 5, the piston 3 includes a plurality of second engaging parts 33. Each of the second engaging parts 33 is engaged with each of the elastic members 82. For example, each second engaging part 33 makes contact with one end surface of each elastic member 82 in the circumferential direction. The second engaging parts 33 are disposed at intervals in the circumferential direction. Each elastic member 82 is interposed by each second engaging part 33 and each third engaging part 83 in the circumferential direction.

Figure 6:
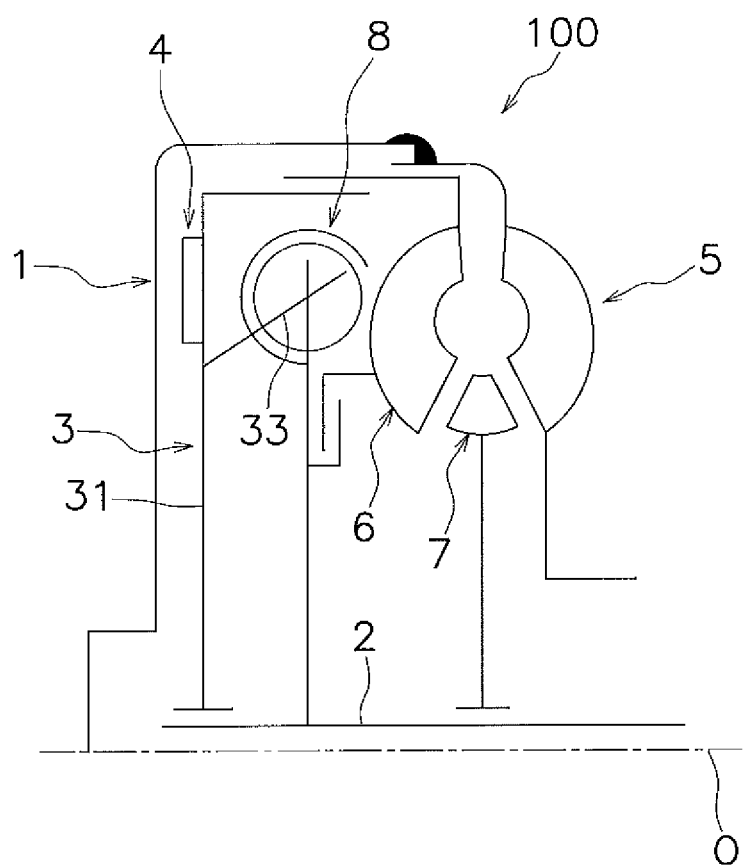
FIG. 6 is a schematic diagram of a torque converter according to modification 2.

The second engaging parts 33 extend from the second tubular portion 32. For example, the second engaging parts 33 are welded to the second tubular portion 32. It should be noted that as shown in FIG. 6, the second engaging parts 33 may extend from the piston body 31. In this case, for instance, the second engaging parts 33 are welded to the piston body 31.

Modification 3

Figure 7:
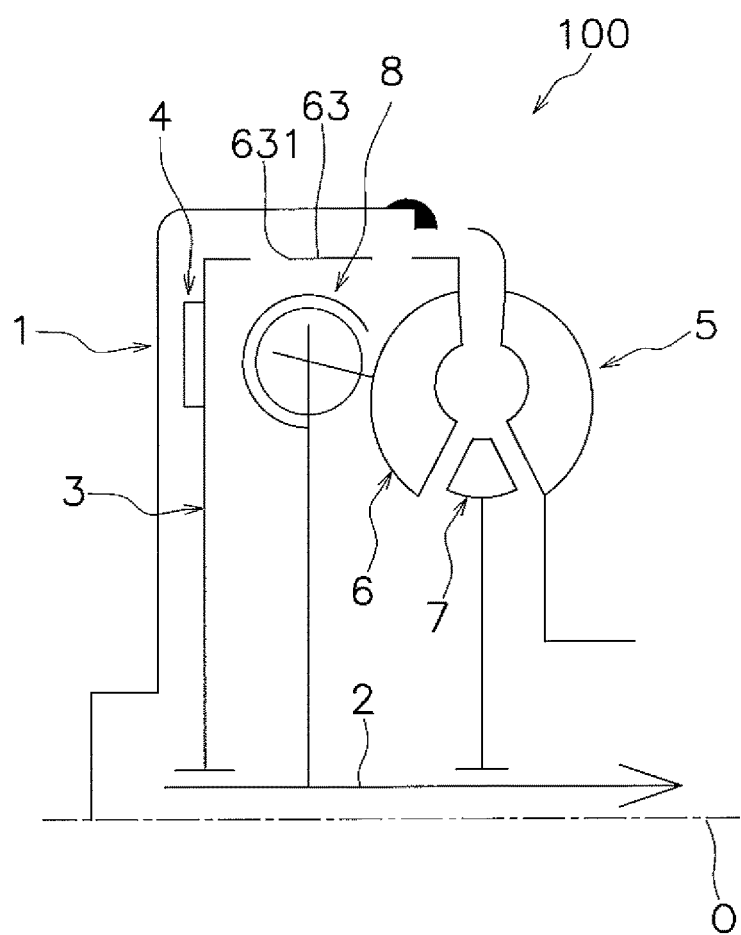
FIG. 7 is a schematic diagram of a torque converter according to modification 3.

As shown in FIG. 7, the connecting portion 63 may be provided with one or more communicating holes 631. The outside and the inside of the connecting portion 63 are communicated through the one or more communicating holes 631 in the radial direction. The number of the communicating holes 631 is plural, for instance, and the communicating holes 631 are provided at intervals in the circumferential direction. The hydraulic oil passes through the communicating holes 631.

Modification 4

Figure 8:
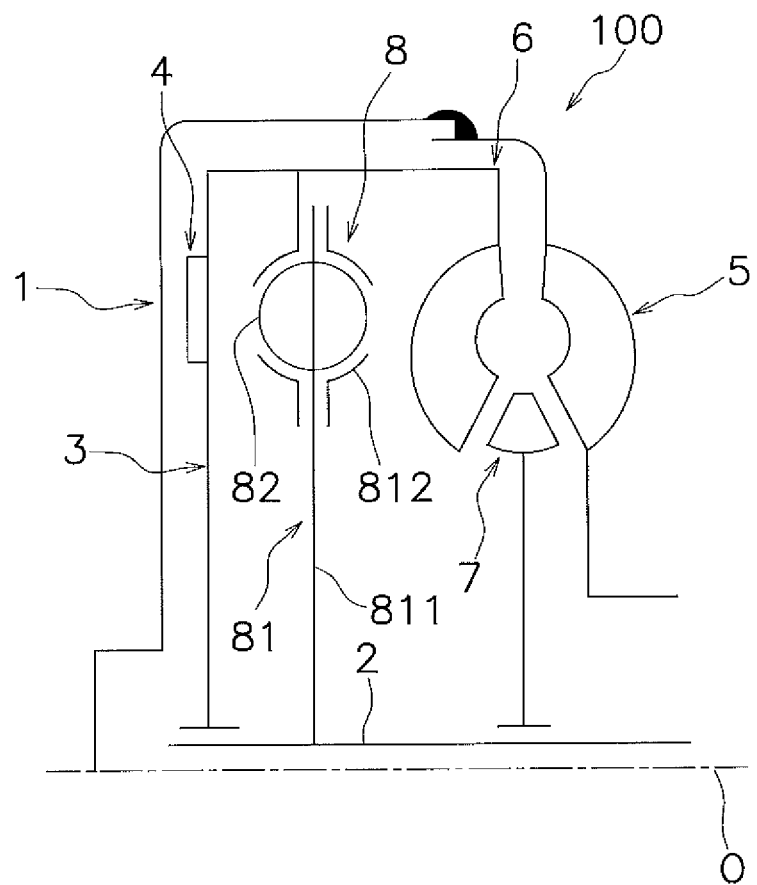
FIG. 8 is a schematic diagram of a torque converter according to modification 4.

As shown in FIG. 8, the holder member 81 of the damper mechanism 8 may be composed of a plurality of plates. For example, as shown in FIG. 8, the holder member 81 includes an output plate 811 and two input plates 812. The output plate 811 is unitarily rotated with the output shaft member 2.

The output plate 811 includes a plurality of accommodation holes (not shown in the drawing). The accommodation holes are disposed at intervals in the circumferential direction. Each of the elastic members 82 is accommodated in each of the accommodation holes.

The input plates 812 are fixed to each other by swaging or so forth while the output plate 811 is interposed therebetween. The input plates 812 are rotatable relatively to the output plate 811. Additionally, accommodation spaces, in each of which each of the elastic members 82 is accommodated, are defined by the input plates 812.

A torque from either the piston 3 or the turbine 6 is inputted into the input plates 812. For example, one of the input plates 812 is fixed to either the piston 3 or the turbine 6. In FIG. 8, one of the input plates 812 is fixed to the connecting portion 63.

Modification 5

Figure 9:
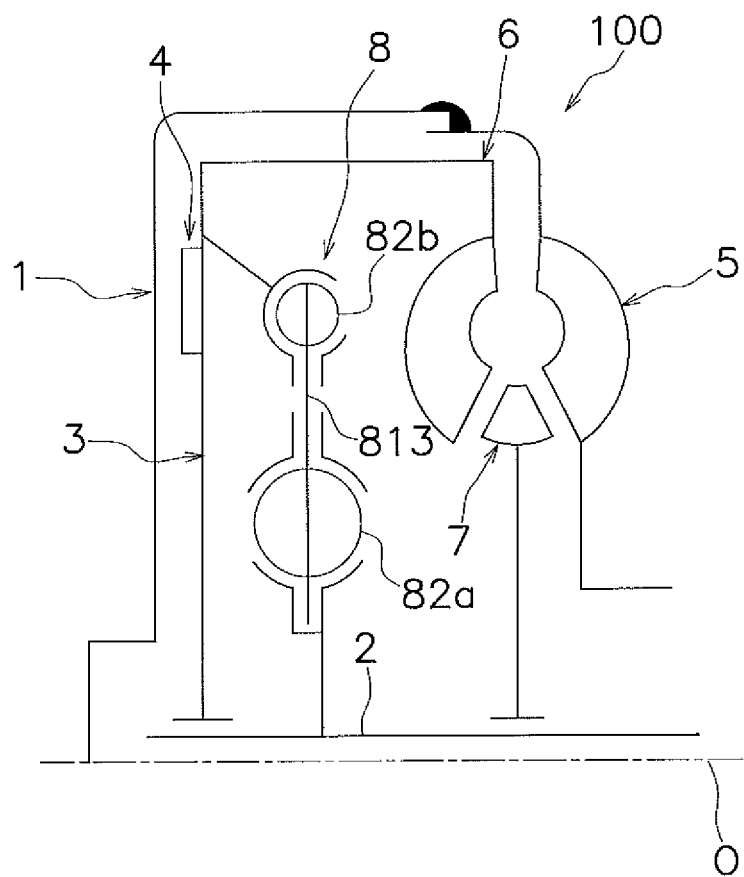
FIG. 9 is a schematic diagram of a torque converter according to modification 5.

As shown in FIG. 9, the damper mechanism 8 may include one or more inner peripheral side elastic members 82*a* and one or more outer peripheral side elastic members 82*b*. The one or more inner peripheral side elastic members 82*a* and the one or more outer peripheral side elastic members 82*b* are connected in series. For example, the one or more inner peripheral side elastic members 82*a* and the one or more outer peripheral side elastic members 82*b* are connected in series through an intermediate plate 813.

Modification 6

Figure 10:
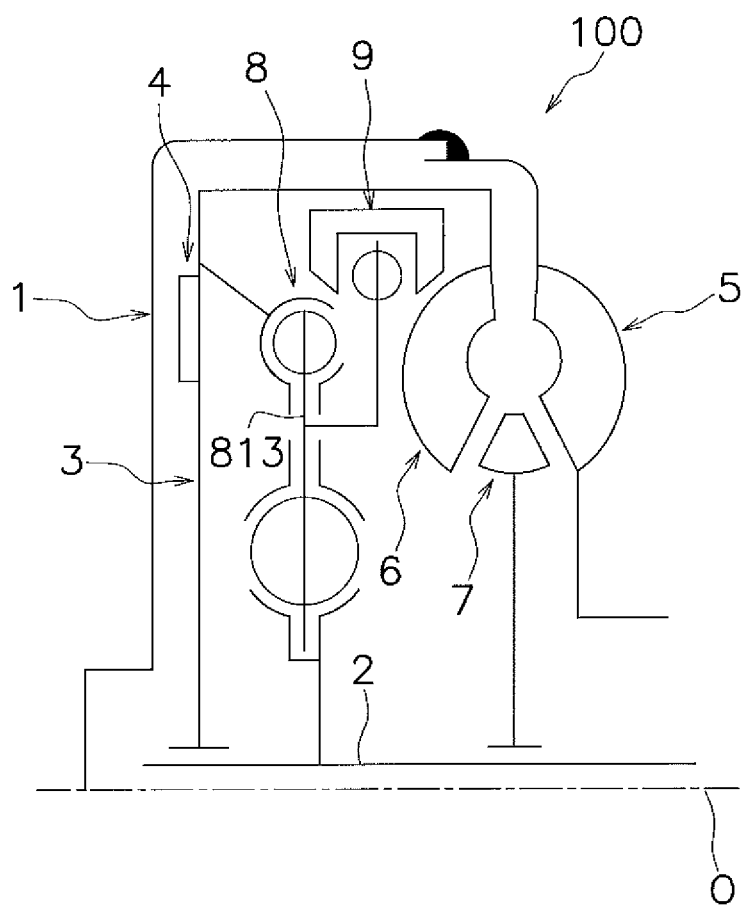
FIG. 10 is a schematic diagram of a torque converter according to modification 6.

As shown in FIG. 10, the torque converter 100 may further include a dynamic vibration absorber 9.

Modification 7

The clutch 4 may be a multi-plate clutch. In other words, the clutch 4 may be constructed to include a plurality of friction plates.

REFERENCE SIGNS LIST

1 Front cover
2 Output shaft member
3 Piston
4 Clutch
5 Impeller
51 Impeller shell
52 Impeller blade
6 Turbine
61 Turbine shell
62 Turbine blade
63 Connecting portion
64 First engaging part
33 Second engaging part
66 Hook portion
8 Damper mechanism
81 Holder member
82 Elastic member
84 Support portion

The invention claimed is:

1. A fluid coupling rotatable about a rotational axis, the fluid coupling comprising:
   a front cover into which a torque is inputted;
   an output shaft member rotatable about the rotational axis, the output shaft member for outputting the torque;
   a piston supported by the output shaft member, the piston capable of sliding on the output shaft member in an axial direction, the piston extending in a radial direction;
   a clutch disposed between the front cover and the piston;
   an impeller including an impeller shell and an impeller blade, the impeller shell fixed to the front cover, the impeller blade attached to the impeller shell;
   a turbine including a turbine shell, a turbine blade and a connecting portion, the turbine shell disposed in opposition to the impeller, the turbine blade attached to the turbine shell, the connecting portion connecting the piston and the turbine shell so as to make the piston and the turbine shell unitarily rotatable; and
   a damper mechanism coupling the output shaft member and either of the turbine and the piston,
   wherein the damper mechanism includes
      a holder member extending in the radial direction, the holder member unitarily rotatable with the output shaft member,
      an elastic member held by the holder member, and the connecting portion is located radially outside the damper mechanism, and
      a support portion supporting the turbine in the axial direction;
   the turbine further including an axially-extending hook axially movable within a space between an end of the support portion and the holder member to restrict an axial movement of the turbine relative to the holder member and output shaft.

2. The fluid coupling according to claim 1, wherein an inner peripheral surface of the turbine shell is located away from the output shaft member in the radial direction.

3. The fluid coupling according to claim 1, wherein the output shaft member and the either of the turbine and the piston are rotatable relatively to each other.

4. The fluid coupling according to claim 3, wherein the turbine includes a first engaging part, the first engaging part engaged with the elastic member.

5. The fluid coupling according to claim 3, wherein the piston includes a second engaging part, the second engaging part engaged with the elastic member.

6. The fluid coupling according to claim 1, wherein the connecting portion connects the piston and the turbine shell so as to make the piston and the turbine shell movable relatively to each other in the axial direction.

7. The fluid coupling according to claim 1, wherein the connecting portion connects the piston and the turbine shell so as to make the piston and the turbine shell immovable relatively to each other in the axial direction.

8. The fluid coupling according to claim 7, wherein the connecting portion is integrated with the piston and the turbine shell.

9. The fluid coupling according to claim 1, wherein the clutch is a friction member attached to the piston.

* * * * *